June 11, 1968   KARL-AUGUST BERKER   3,387,651
HEATING AND COOLING ARRANGEMENT FOR MIXERS
Filed April 25, 1966
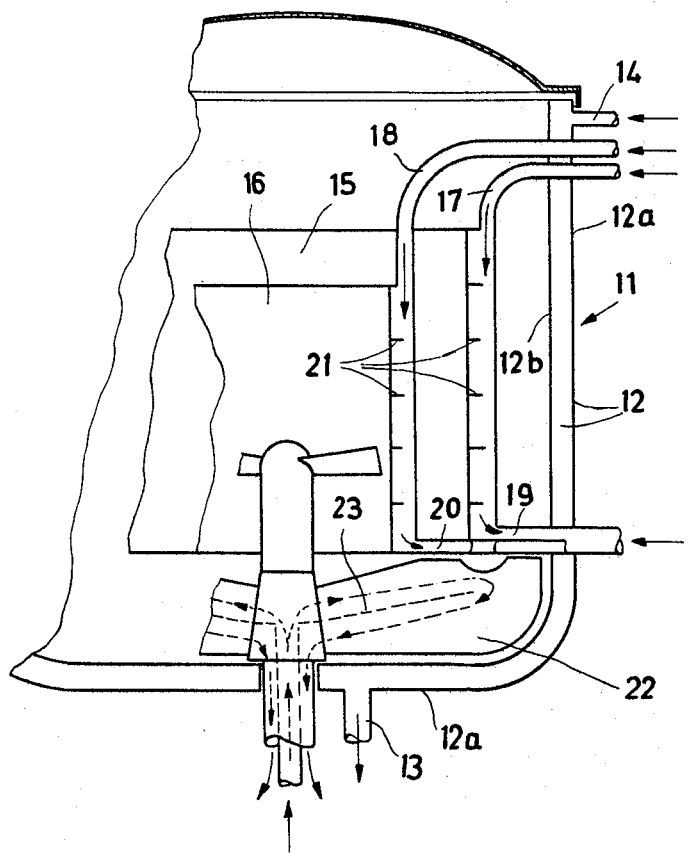
INVENTOR
Karl-August Berker
BY Spencer & Kaye
ATTORNEYS

United States Patent Office 3,387,651
Patented June 11, 1968

3,387651
HEATING AND COOLING ARRANGEMENT
FOR MIXERS
Karl-August Berker, Heidenoldendorf, Germany, assignor to Gunther Papenmeier KG., Pivitsheide Vogtei Lage, Germany
Filed Apr. 25, 1966, Ser. No. 545,085
Claims priority, application Germany, Apr. 23, 1965, P 36,607
8 Claims. (Cl. 165—109)

ABSTRACT OF THE DISCLOSURE

A mixing arrangement for plastic materials having means for heating or cooling the material to be mixed. At least one and possibly several double-walled rings are provided which are parallel to the container. At least one mixing implement is provided below the rings to provide for such circulation that there will be efficient heating or cooling of the material being mixed.

---

The present invention relates generally to the mixing art, and, more particularly, to a mixing arrangement useful in the preparation of plastic materials and which is provided with a device for heating or cooling the material to be mixed.

The design of a container for a mixer having a double wall and having a heating or cooling agent flowing through it for supplying heat to the mixing material or withdrawing heat from the mixing material is already known. Also known are arrangements for mixing implements in which heating or cooling agents can flow therethrough.

Known mixers have the disadvantage that the heat can not be fed to or removed from the mixing material in a sufficiently rapid manner because the surfaces on which the heat exchange is to take place are limited. However, rapid heat exchange is something which is in many cases desirable.

With this in mind it is a main object of the present invention to provide a mixing device in which heat exchange can take place in a sufficiently rapid manner.

Another object of the present invention is to provide an arrangement whereby mixing material in a mixing arrangement is sufficiently exposed and in sufficient heat exchange contact with the inner surfaces of the arrangement that efficient heating and cooling, as desired, of the material to be mixed, can take place.

These objects and others ancillary thereto are accomplished in accordance with preferred embodiments of the invention wherein the mixing container is provided with at least one double-walled ring which is disposed parallel to the container shell and having an inner space between its double walls in which a heating and cooling agent may flow. This ring is preferably spaced from the inner wall of the container so that the material to be mixed can be moved by the mixing implement between the ring and the inner wall of the container and so that the material to be mixed can also be moved by the mixing implement past the inner wall of the ring. A mixer which is so designed has indicated that the output of the mixer can be substantially improved and the time required for heating or cooling can be substantially diminished, and this in many cases has the effect of increasing the quality of the material to be mixed.

Additional objects and advantages of the present invention will become apparent upon consideration of the following description when taken in conjunction with the accompanying drawings in which the sole figure is a diagrammatic sectional view of an embodiment of the present invention.

With more particular reference to the drawings, FIGURE 1 illustrates a container 11 which is provided with a double wall 12. A pipe 13 is connected with the interior of this double wall 12 at the bottom of the container and another pipe 14 is fitted in the outer wall 12a of the container 11 near the upper rim so as to communicate with the interior of the double wall. A heating or cooling agent can be introduced or removed through these pipes for heating or cooling the inner wall 12b of the container.

In the interior of the container 11 of the mixer is a hollow ring 15 which extends preferably parallel to the inner wall 12b and is spaced inwardly from the inner wall. A second correspondingly designed ring 16 is arranged concentrically with respect to the ring 15 but is spaced from and disposed interiorly of it. A plurality of conduits 17, 18, 19 and 20 are connected to the upper and lower ends of these rings and extend outwardly through the container shell 12 and serve for the introduction or removal of a heating or cooling agent. If required it is also possible to guide two pipes one within the other.

Guides plates 21 are provided in the flat rings 15 and 16 to provide for constrained conveying of the cooling or heating agent which flows through the rings. If desired individual passage apertures may be formed in the guide plates in order to enable an improved flow through the rings.

The bladed centrifugal plate 22 which provides for rotation of the mixing material within the container is made to be hollow and a heating or cooling agent can flow through its cavity. Guide plates 23 are advantageously arranged in the cavity of the bladed centrifugal plate 22.

Thus, it can be seen that the present invention achieves its objects by providing at least one, and in the illustrated embodiment two, rings which are hollow and are concentrically arranged with respect to each other and which can be heated or cooled. In order to provide for optimum conditions guide plates are provided in the inner space of the hollow rings and these plates preferably extend spirally throughout the cavity and channel the flow of the heating or cooling agent in accordance with the shape and configuration of the plates.

The rings disposed interiorly of the container are connected via tubes to a conduit system for feeding-in the heating or cooling agent in the desired manner so that the agent flows through the inner space of the rings either in the same direction of flow or in a counter flow direction with respect to the direction which the mixing material takes as it is mixed by the mixing implement. In an advantageous manner the mixer containing the hollow flat rings on the one hand has a double outer wall for heating or cooling purposes and on the other hand has a mixing implement through which a heating or cooling medium can flow, and by this arrangement optimum conditions are provided.

Using the mixer designed in accordance with the present invention it is possible to reduce the time required for treatment of a mixing material. When using an inner cooling ring it is possible to halve the time required for treatment in a mixer of previously conventional design and when two concentric inner cooling rings are used the cooling time can be cut to one third of the time required with conventional treatment. This provides a considerable increase in the output of the mixer and an improvement in the quality of the mixing material.

It will be understood that the above description of the present invention is susceptible to various modifications, changes, and adaptations, and the same are intended to be comprehended within the meaning and range of equivalents of the appended claims.

What is claimed is:

1. A mixer device particularly for preparing plastic material or the like comprising, in combination:
   a mixing container having a shell; and
   at least one double-walled ring disposed interiorly of and parallel to the shell of the container and through which a heating or cooling agent may flow and a mixing implement disposed adjacent the bottom wall of said container and between said bottom wall and said ring so that the material to be mixed can be displaced by said mixing implement.

2. A device as defined in claim 1 wherein two double-walled rings concentric to each other are used.

3. A device as defined in claim 2 comprising guide plates disposed within said rings for conveying the heating or cooling agent therethrough.

4. A device as defined in claim 3 wherein apertures are provided in the guide plates.

5. A device as defined in claim 4 wherein said mixing implement comprises a hollow mixing implement disposed in the bottom of said container for moving the material to be mixed within the innermost ring, between the two rings, and between the outer ring and the container wall.

6. A device as defined in claim 5 wherein said mixing implement is hollow and arranged for a heating or cooling agent to flow therethrough.

7. A device as defined in claim 6 wherein said container wall is a double wall and arranged for a heating or cooling agent to flow therethrough.

8. A device as defined in claim 1 wherein said container and said ring are generally cylindrical.

UNITED STATES PATENTS
References Cited

| | | | |
|---|---|---|---|
| 2,875,027 | 2/1959 | Dye | 165—109 |
| 2,926,002 | 2/1960 | Spielvogel | 165—109 |
| 2,982,522 | 5/1961 | Hamilton et al. | 165—92 |

ROBERT A. O'LEARY, *Primary Examiner.*

CHARLES SUKALO, *Examiner.*